United States Patent
Pistol et al.

(10) Patent No.: US 10,445,102 B1
(45) Date of Patent: Oct. 15, 2019

(54) NEXT FETCH PREDICTION RETURN TABLE

(71) Applicant: Apple Inc., Cupertino, CA (US)

(72) Inventors: Constantin Pistol, Cupertino, CA (US); Ian D. Kountanis, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 15/707,834

(22) Filed: Sep. 18, 2017

(51) Int. Cl.
 *G06F 9/30* (2018.01)
 *G06F 9/38* (2018.01)

(52) U.S. Cl.
 CPC ........ *G06F 9/3844* (2013.01); *G06F 9/30047* (2013.01); *G06F 9/3816* (2013.01); *G06F 9/3832* (2013.01)

(58) Field of Classification Search
 None
 See application file for complete search history.

(56) References Cited

U.S. PATENT DOCUMENTS

| | | | | |
|---|---|---|---|---|
| 5,163,140 A | * | 11/1992 | Stiles | G06F 9/3804 711/120 |
| 6,877,089 B2 | * | 4/2005 | Sinharoy | G06F 9/30047 712/239 |
| 7,783,870 B2 | * | 8/2010 | Levitan | G06F 9/3844 712/237 |
| 7,856,548 B1 | * | 12/2010 | Nelson | G06F 9/3832 712/220 |
| 2013/0311760 A1 | * | 11/2013 | Kothari | G06F 9/3806 712/240 |
| 2017/0139717 A1 | * | 5/2017 | Hornung | G06F 9/30058 |

* cited by examiner

*Primary Examiner* — Corey S Faherty
(74) *Attorney, Agent, or Firm* — Meyertons Hood Kivlin Kowert and Goetzel PC; Rory D. Rankin

(57) ABSTRACT

Systems, apparatuses, and methods for efficient program flow prediction. After receiving a current fetch address, a first predictor performs a lookup of a first table. When the lookup results in a miss and the first table has no available entries, the first predictor overwrites a given entry of the first table with the received fetch address, in response to detecting a strength value for the given entry is below a threshold. Otherwise, in response to detecting no entries of the first table have a strength value below the threshold, the first predictor allocates an entry in the second table for the received fetch address. When an indication of a target address for the received fetch address is a return address for a function call, a third predictor allocates an entry of a third table with the received fetch address.

20 Claims, 7 Drawing Sheets

Fetched Groups of Instructions 200

| Fetch Group Address (205) | Instruction Offset (210) | Instruction Type (215) | Target Address Indication (225) | |
|---|---|---|---|---|
| 0x04A8 | 0 | Non-Branch | Unknown | |
| 0x04A8 | 1 | Non-Branch | Unknown | |
| 0x04A8 | ⋮ | ⋮ | ⋮ | |
| 0x04A8 | ⋮ | ⋮ | ⋮ | |
| 0x04A8 | 7 | Conditional direct branch, Target-A | Target-A | Group 230 |
| 0x04A8 | 8 | Non-Branch | Target-B | |
| 0x04A8 | ⋮ | ⋮ | ⋮ | |
| 0x04A8 | 11 | Conditional direct branch, Target-B | Target-B | |
| 0x04A8 | ⋮ | ⋮ | ⋮ | |
| 0x04A8 | 14 | Call-return | RAS pop | |
| 0x04A8 | 15 | Non-Branch | 0x04A8 + Line Width = 0x04A8+15+1 | |
| ⋮ | ⋮ | ⋮ | ⋮ | |
| 0x150C | 9 | Conditional direct branch, Target-A | Target-C | Group 232 |
| ⋮ | ⋮ | ⋮ | ⋮ | |

*FIG. 2*

NEXT FETCH PREDICTION RETURN TABLE

BACKGROUND

Technical Field

Embodiments described herein relate to the field of processors and more particularly, to efficient program flow prediction mechanisms.

Description of the Related Art

Modern processors typically include multiple pipeline stages that facilitate execution of program instructions. Execution may begin at an initial stage in which an instruction fetch unit retrieves instructions from memory using a register commonly referred to as a program counter or PC. In many instances, the PC value is the address of an instruction in memory. As an instruction fetch unit retrieves instructions from memory, the instruction fetch unit may increment the PC value by an instruction width multiplied by some number of instructions. This PC value may also be altered when control transfer instructions are executed such as conditional branch instructions, call instructions, return instructions, jump instructions, etc.

A variety of instruction control flow predictors, such as branch predictors, are used to predict the next target address to fetch from memory to allow the processor to fetch ahead of the control transfer instructions. If the predictions are correct, subsequent instructions to execute may already be preloaded into the processor's pipeline. Correct prediction may enhance performance (e.g., execution time), as compared to fetching the instructions after executing each control transfer instruction. Furthermore, the subsequent instructions may be speculatively executed and thus may be ready to retire/commit results when the control transfer instruction is resolved (if the prediction is correct), which may further enhance performance. However, for the control flow predictors to provide successful predictions, the control flow predictors use a amount of time and information.

In view of the above, efficient methods and mechanisms for efficient program flow prediction are desired.

SUMMARY

Systems, apparatuses, and methods for efficient program flow prediction are contemplated. In various embodiments, a processor includes an instruction fetch unit and at least a first predictor and a second predictor. A current fetch address used to fetch a group of instructions from an instruction cache is generated. In some embodiments, an address selector conveys the current fetch address by selecting it from multiple sources of fetch addresses. The first predictor includes a first table. Each entry of the first table stores at least a portion of a fetch address and an indication of a target address. After receiving the current fetch address, the first predictor performs a lookup of the first table with the current fetch address. When the lookup results in a miss, the first predictor searches for an entry that is available for allocation. In various embodiments, an entry is considered available when it stores no valid information. However, if no available entry is found (i.e., the table is full), then the first predictor identifies one or more candidate entries for allocation. In some embodiments, the first table has a set associative arrangement. For example, the first table is an n-way set associative data structure where 'n' is a positive integer. The candidate entries for allocation are the 'n' ways within the set selected during lookup.

In some embodiments, the first predictor maintains a strength value for each entry. As used herein, a "strength value" refers to a value indicating a probability the stored fetch group address provides a useful prediction such as the next fetch address. In an embodiment, a useful prediction is an accumulative count above a threshold of a number of verified and correct predictions for the next fetch address provided by the fetch group address. In various embodiments, verification is performed by comparing the next fetch address with a predicted target address generated by a branch predictor.

When a given entry in the first predictor stores a strength value above a threshold, the fetch group address stored in the given entry is considered to be relatively strong for providing a useful prediction such as the next fetch address (target address) also stored in the given entry. The probability the next fetch address provides a correct prediction for where to branch in program code to continue instruction processing is relatively high. When the given entry in the first predictor stores a strength value below a threshold, the fetch group address stored in the given entry is considered to be relatively weak for providing a useful prediction such as the next fetch address (target address) also stored in the given entry. The probability the next fetch address provides a correct prediction for where to branch in program code to continue instruction processing is relatively low.

In an embodiment, the strength value is a combination of a predictive strength and hysteresis. In some embodiments, a value for predictive strength indicates whether the next fetch address (predicted target address) should remain stored in the first predictor rather than be replaced with another next fetch address, despite a detected misprediction for the next fetch address. A value for hysteresis indicates whether the entire entry for the fetch group address (or a portion, thereof) should remain stored in the first predictor, rather than be replaced with another fetch group address and corresponding data, despite a detected misprediction for the fetch group address. In one embodiment, an indication of the strength value, which may be a combination of the predictive strength and hysteresis, is generated by a saturating counter. In an embodiment, the higher the count, the higher the strength value.

When the first table has no entries available for allocation (e.g., each entry has been allocated and stores valid information) a given entry is overwritten with the current, received, fetch address in response to determining the strength value for the given entry is detected to be below the threshold. However, in response to determining no entries of the first table are detected to have a strength value below the threshold, an entry in a second table of the second predictor is allocated with the current, received, fetch address. Accordingly, the associativity is increased for the selected set. When the strength value for a given candidate entry of the one or more candidate entries falls below the threshold at a later time, the contents of the entry in the second table may replace the given candidate entry.

The branch predictor in the processor determines a prediction in a later pipeline stage. In some embodiments, the branch predictor is more accurate than the first predictor and the second predictor. However, the branch predictor uses multiple clock cycles to resolve an indication of a target address. In contrast, each of the first predictor and the second predictor resolves an indication of a target address in less time such as a single clock cycle in some embodiments. The branch predictor may train at least the first predictor. If the prediction from the branch predictor matches the prediction from the first predictor, then the strength value for the entry in the table is increased. If the prediction from the branch predictor does not match the prediction from the first predictor, then the strength value for the entry in the table is decreased.

In various embodiments, the processor also includes a third predictor. When an indication of a target address for a given fetch address is a return address for a function call, the third predictor allocates an entry of a third table with an indication of the given fetch address. In some embodiments, the entries of the third table store a tag portion of the given fetch address, but does not store an indication of a target address.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 2 is a block diagram of one embodiment of fetched groups of instructions.

Figure 1:
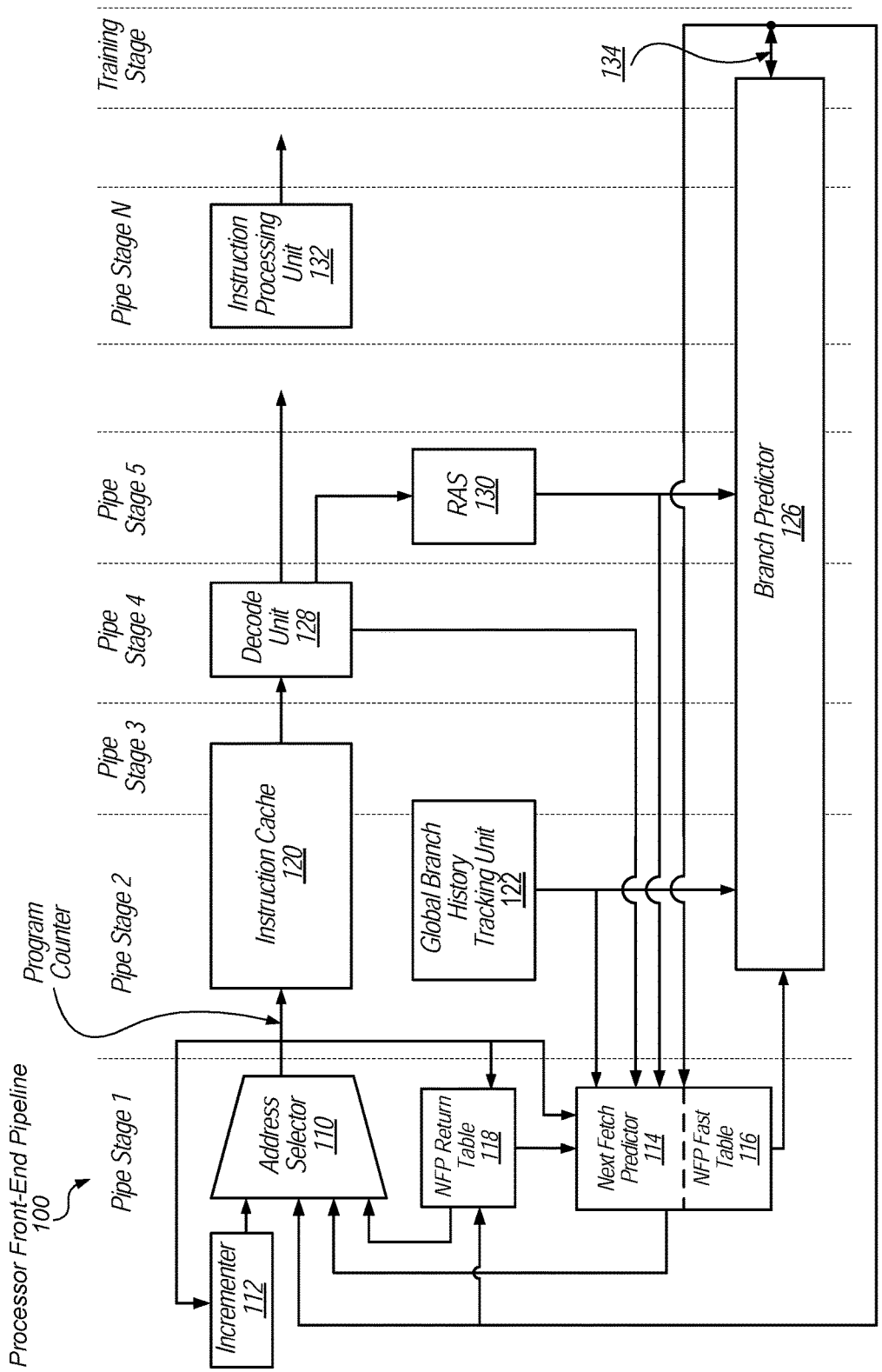
FIG. 1 is a block diagram of one embodiment of a front-end pipeline of a processor.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram illustrating one embodiment of a front-end pipeline 100 of a processor is shown. In the embodiment shown, pipeline 100 is a multi-stage pipeline for the processing of instructions. A processor "pipeline" may be used to split the "work" a processor performs on instructions into multiple stages. In one embodiment, instruction decode, dispatch, execution, and retirement may be examples of different pipeline stages. Various pipeline stages perform such steps on an instruction during one or more processor clock cycles and then pass the instruction and/or operations associated with the instruction on to other stages for further processing. Many different pipeline architectures are possible with varying orderings of elements. In one embodiment, the front-end pipeline 100 may be included in one or more processor core pipelines of a central processing unit (CPU). It is also noted that the ordering of pipeline stages in FIG. 1 is intended to be representative of one embodiment and not to exclude other implementations.

An instruction cache 120 may store instructions for a software application (e.g., a user application, operating system) executing on the processor. One or more instructions indicated by a program counter (PC) address conveyed by the address selector 110 are fetched (i.e., retrieved) from the instruction cache 120. Multiple instructions may be fetched from the instruction cache 120 per clock cycle if there are no instruction cache misses (i.e., the requested instructions are currently located in instruction cache 120). In certain embodiments, the processor may implement an address translation scheme allowing one or more virtual address spaces to be made visible to executing software.

Memory accesses within the virtual address space may be translated to a physical address space corresponding to the actual physical memory available to the processor. In embodiments of processors that employ address translation, instruction cache 120 may be partially or completely addressed using physical address bits rather than virtual address bits. For example, in one embodiment, instruction cache 120 may use virtual address bits for cache indexing and physical address bits for cache tags. In order to avoid the cost of performing a full memory translation when performing a cache access, the processor may store a set of recent and/or frequently used virtual-to-physical address translations in a translation lookaside buffer (TLB), which is not shown in FIG. 1.

In the embodiment shown, the current fetch address supplied to instruction cache 120 comes from address selector 110. In this particular implementation, selector 110 receives four different inputs (other numbers of inputs are possible depending on the embodiment). One input to selector 110 is supplied by incrementer 112, which supplies a next sequential PC address for the next fetch group (i.e., the next PC for the next fetch group assuming there is not a taken branch in the current fetch group). Other inputs are supplied to selector 110 by next fetch predictor 114, next fetch prediction (NFP) fast table 116, NFP return table 118 and branch predictor 126. In one embodiment, each of next fetch predictor 114, NFP fast table 116 and NFP return table 118 generates a non-sequential PC address based on a prediction for a given control transfer instruction in the current fetch group.

In various embodiments, next fetch predictor 114, NFP fast table 116, NFP return table 118 and branch predictor 126 predict the direction and target of control transfer instructions (e.g., branches). It is noted that throughout this disclosure, the terms "control transfer instruction," "program flow instruction" and "branch instruction" may be used interchangeably. Such instructions include at least conditional branch instructions, call instructions, return instructions, jump instructions, etc. Additionally, while the term "branch instruction" or (or more briefly, "branch") may be used throughout this disclosure, it should be understood that the term applies to any type of control transfer instruction that may be utilized in an instruction set architecture.

As can be seen from the depiction of pipeline stages in FIG. 1, each of next fetch predictor 114, NFP fast table 116 and NFP return table 118 generates an address prediction prior to predictions generated by branch predictor 126. In some embodiments, each of next fetch predictor 114, NFP fast table 116 and NFP return table 118 generates an address prediction within a single clock cycle. While one or more of next fetch predictor 114, NFP fast table 116 and NFP return table 118 may generate predictions at the granularity of fetch groups (which include multiple instructions and potentially multiple branch instructions), the branch predictor 126 may generate predictions at the granularity of individual branch instructions. In one embodiment, branch predictor 126 may receive at least a portion of the PC address used to fetch instructions from the instruction cache 120. Using this and other information, branch predictor 126 may perform a prediction of the direction and target of a branch instruction that was predicted by one or more of next fetch predictor 114, NFP fast table 116 and NFP return table 118.

The prediction of branch predictor 126 may, in many embodiments, be relatively slower (and thus more accurate) than the prediction generated by next fetch predictor 114, NFP fast table 116 and NFP return table 118. For instance, branch predictor 126 may combine, in a separate hash function, at least a portion of the received PC address with another portion of itself or with other values, such as history information provided by global branch history tracking unit 122. Various hashing functions may be performed to determine an index to one or more pattern history tables (PHTs), branch target buffers (BTBs), and/or other tables used to provide branch prediction data 134.

The branch prediction data 134 may include a branch direction and a branch target address. The branch predictor 126 may utilize multiple clock cycles to both determine the outcome of the condition of a branch instruction and to determine the branch target address. The branch predictor 126 may thus provide branch prediction data 134 with higher prediction accuracy than next fetch predictor 114, NFP fast table 116 and NFP return table 118. The branch predictor 126 may perform a parallel, slower branch prediction, which may or may not confirm the prediction generated by one of next fetch predictor 114, NFP fast table 116 and NFP return table 118. For performance reasons, however, it may be desirable to obtain a faster prediction. Therefore, next fetch predictor 114, NFP fast table 116 and NFP return table 118 may be used to provide a quick, initial branch prediction.

In the illustrated embodiment, each of next fetch predictor 114, NFP fast table 116 and NFP return table 118 provides a predicted next address to instruction cache 120 through address selector 110. In other embodiments, each of next fetch predictor 114, NFP fast table 116 and NFP return table 118 provides predicted fetch address to instruction cache 120 through other communication paths. In some embodiments, one or more of next fetch predictor 114 and NFP fast table 116 may access branch prediction information based on the PC address of the current fetch group and/or global branch history data supplied by global branch history tracking unit 122. On the other hand, NFP return table 118 may not access this information. In some embodiments, NFP fast table 116 may also not access this information.

In some embodiments, the next fetch address generated by one of next fetch predictor 114, NFP fast table 116 and NFP return table 118 may be verified later in the pipeline by comparison to a prediction from the branch predictor 126. The branch predictor 126 may generate branch prediction data at a later time and with higher prediction accuracy. In one embodiment, the prediction data generated by next fetch predictor 114, NFP fast table 116 and NFP return table 118 is stored and staged along the pipeline so as to be made available to various pipeline stages. The staged prediction data may be compared to prediction data generated at a later pipeline stage by the branch predictor 126 or completion data generated from execution and completion of branch instructions.

When one of next fetch predictor 114, NFP fast table 116 and NFP return table 118 generates branch prediction data that does not match prediction data 134 generated by the branch predictor 126 at a later time, an indication of a misprediction is generated, and multiple stages of the processor pipeline may be flushed and fetches may be restarted at the new address. Additionally, one or more of next fetch predictor 114, NFP fast table 116 and NFP return table 118 may be updated or trained with the prediction data 134 generated by the branch predictor 126 (e.g., during the training stage of FIG. 1). Next fetch predictor 114, NFP fast table 116 and NFP return table 118 may be similarly trained at retirement or completion of relevant instructions. Note that the training stage may precede pipeline stage N in some embodiments.

In some embodiments, next fetch predictor 114 stores a strength value with the indications of a fetch address and a next fetch address in a given entry. In various embodiments, the strength value is a combination of a predictive strength and a hysteresis value. In other embodiments, next fetch predictor 114 stores separate values for predictive strength and hysteresis in the given entry. In some embodiments, a value for predictive strength indicates whether the next fetch address (predicted target address) should remain stored in next fetch predictor 114, rather than be replaced with another next fetch address, despite a detected misprediction for the next fetch address. A value for hysteresis indicates whether the entire entry for the fetch group address (or a portion, thereof) should remain stored in next fetch predictor 114, rather than be replaced with another fetch group address and corresponding data, despite a detected misprediction for the fetch group address.

In one embodiment, the predictive strength is a count of a number of consecutive correct predictions provided by the next fetch address in the entry. The higher the count, the higher the predictive strength. In other embodiments, a lower count indicates a higher predictive strength. In another embodiment, a one-hot mask is used where the location of a bit set to a logical high value in the mask indicates the predictive strength. In other embodiments, the location of a bit set to a logical high value in the mask indicates the predictive strength. Other embodiments are possible and contemplated for indicating the predictive strength. In an embodiment, an indication of hysteresis may indicate a given branch instruction exhibits a frequently alternating pattern regarding its branch direction. Such behavior may lead to branch mispredictions due to the training is being unable to keep up with the changing branch direction. When such a condition is determined to occur, the control logic may prevent training of one or more of next fetch predictor 114, NFP fast table 116 and NFP return table 118. In some embodiments, an indication of hysteresis is a single bit stored in the entry.

Rather than store two separate values, such as one value for predictive strength and one value for hysteresis, in some embodiments, next fetch predictor 114 stores a single value to combine predictive strength and hysteresis. The single value is used for indicating whether to replace a next fetch address (target address) during a hit in next fetch predictor 114 and whether to replace the entire entry during a miss in next fetch predictor 114. As used herein, a "strength value" refers to a value indicating a probability the stored fetch group address provides a useful prediction such as the next fetch address. When a given entry in the first predictor stores a strength value above a threshold, the fetch group address stored in the given entry is considered to be relatively strong for providing a useful prediction such as the next fetch address (target address) also stored in the given entry. The probability the next fetch address provides a correct prediction for where to branch in program code to continue instruction processing is relatively high. When the given entry in the first predictor stores a strength value below a threshold, the fetch group address stored in the given entry is considered to be relatively weak for providing a useful prediction such as the next fetch address (target address) also stored in the given entry.

In some embodiments, the strength value is represented by a saturating counter. The higher the count, the higher the strength. In other embodiments, a lower count indicates a higher strength. In another embodiment, a one-hot mask is used where the location of a bit set to a logical high value in the mask indicates the strength. In other embodiments, the location of a bit set to a logical high value in the mask indicates the strength. Other embodiments are possible and contemplated for indicating the strength. Therefore, the access result, such as a hit or a miss, combined with the strength value determines whether to replace the next fetch address in a given entry, replace the entire given entry, or allow the given entry to remain. The access result also determines whether to increase or decrease the strength value if the given entry is not replaced.

During misprediction, in an embodiment, the corresponding strength value is reduced (weakened). As described above, in one embodiment, the strength value is a saturating count. In one embodiment, correct predictions increase the count, whereas, mispredictions decrease the count. In other embodiments, a lower count indicates a higher strength. In another embodiment, a one-hot mask is used where the location of a bit set to a logical high value in the mask indicates the predictive strength. Other embodiments are possible and contemplated for indicating the predictive strength.

In various embodiments, when a misprediction (mismatch) occurs, control logic, such as logic implemented by circuitry surrounding each of next fetch predictor 114, NFP fast table 116 and NFP return table 118, may train one or more of the next fetch predictor 114, NFP fast table 116 and NFP return table 118. Training may include updating stored values in one or more of next fetch predictor 114, NFP fast table 116 and NFP return table 118 with the branch prediction data generated by the branch predictor 126. In addition, when an indication of a next fetch address (target address) for a given fetch address is a return address for a function call, the corresponding information is allocated in an entry of NFP return table 118 with an indication of the given fetch address. In some embodiments, the entries in the NFP return table 118 store a tag portion of the given fetch address, but does not store an indication of a target address since the target address is stored in the return address stack (RAS) 130.

In some embodiments, each of next fetch predictor 114, NFP fast table 116 and NFP return table 118 receives a current fetch group address at the same time. Each of next fetch predictor 114, NFP fast table 116 and NFP return table 118 may perform a lookup. When the multiple lookup operations result in a hit for two or more of next fetch predictor 114, NFP fast table 116 and NFP return table 118, a priority scheme in the control logic determines from where address selector 110 receives a prediction to be used as the next fetch group address. For example, in an embodiment, processor front-end pipeline 100 includes selection logic prior to address selector 110 which selects between predictions from next fetch predictor 114, NFP fast table 116 and NFP return table 118. Therefore, only a single prediction is provided to address selector 110. In an embodiment, next fetch predictor 114 has the highest priority with NFP return table 118 having the second highest priority and NFP fast table 116 having the lowest priority. However, other priority schemes are possible and contemplated.

In one embodiment, next fetch predictor 114 includes a table including multiple entries, with each entry storing at least a current fetch address (or a portion thereof), and a prediction of the next fetch address. In some embodiments, each entry additionally stores a width of data to fetch with the next fetch address. In other embodiments, each entry additionally stores global branch history data. In various embodiments, the table in next fetch predictor 114 is stored in an array. In some embodiments, the table in next fetch predictor 114 is stored in a set-associative cache.

Each fetch group may include up to 'N' instructions, wherein 'N' may vary from embodiment to embodiment and from fetch group to fetch group, and wherein 'N' is a positive integer. Some fetch groups may include more than one branch instruction, resulting in the fetch group having multiple potential targets. In some embodiments, only a single fetch group address (or a portion, thereof) is stored in the next fetch table 114 with a corresponding next fetch address. Replacing the next fetch address with another next fetch address may occur after a misprediction is detected and after determining a strength value representing a combination of the predictive strength and hysteresis falls below a threshold. In another embodiment, next fetch predictor 114 may include a dual-tag table structure which includes a fetch group address tag and a branch history tag (not shown) for each entry of the table so as to disambiguate between the multiple branches in a fetch group.

In one embodiment, when next fetch predictor 114 receives a current fetch group address, next fetch predictor 114 may perform a lookup of the fetch group address tag field of the table using the current fetch group address. If the lookup results in a miss, then control logic may utilize an address from another predictor such as NFP fast table 116 and NFP return table 118. If the lookup results in a hit to a single entry, then next fetch predictor 114 may convey the prediction from the hit entry to address selector 110 to be used as the next fetch group address. It is noted that while tables 114 and 118 are generally described as array or associative type structures, those skilled in the art will appreciate that a variety of types of structures are possible. Numerous types of structures are possible and are contemplated.

When the lookup for next fetch predictor 114 results in a miss, next fetch predictor 114 searches for an empty entry for allocation. However, if no empty entry is found, then next fetch predictor 114 identifies one or more candidate entries for allocation. In some embodiments, next fetch predictor 114 includes an array with a set associative arrangement. For example, the array in next fetch predictor 114 is an n-way set associative data structure where 'n' is a positive integer. In an embodiment, the candidate entries for allocation are the 'n' ways within the set selected during lookup.

In some embodiments, when a strength value for a given entry of the one or more candidate entries is below a threshold, the given entry is considered to be relatively weak for providing useful predictions, and the given entry is overwritten with the current fetch address. When none of the one or more candidate entries has a strength value below the threshold, each of the candidate entries is considered to be relatively strong for providing useful predictions. Therefore, no replacements are performed in next fetch table 114, and an entry in NFP fast table 116 is allocated with the current fetch address. Accordingly, the associativity is increased for the selected set of next fetch predictor 114 due to the external entries in NFP fast table 116. In some embodiments, the table in NFP fast table 116 is stored in a cache or other memory device. In yet other embodiments, the table in NFP fast table 116 is stored in one or more registers. When the strength value for a given candidate entry of the one or more candidate entries falls below the threshold at a later time, the entry in the array of NFP fast table 116 replaces the given candidate entry in next fetch predictor 114. In some embodiments, the entries of NFP fast table 116 use a first-in-first-out (FIFO) arrangement.

Decode unit 128 may, in one embodiment, decode the opcodes of the multiple fetched instructions. Decode unit 128 may send the instructions with additional decoded information to other components in the processor for instruction processing in later pipeline stages. These later pipeline stages are generically represented by instruction processing unit 132. For example, the decode unit 128 may allocate entries in a dispatch queue. Register renaming, instruction scheduling, executing arithmetic operations and/or performing memory accesses, and in-order retiring are just some examples of later instruction processing steps. In one embodiment, decode unit 128 may forward data to a later pipeline stage while bypassing other pipeline stages. For example, decode unit 128 may decode branch instructions and forward decoded instruction information to next fetch predictor 114 and/or branch predictor 126.

In one embodiment, return address stack (RAS) 130 may be configured to store return addresses for call instructions that are encountered in the instruction stream. When a first call instruction is encountered, the return address associated with the first call instruction is pushed onto RAS 130. If more call instructions are encountered, the corresponding return addresses are pushed onto RAS 130. When a return instruction is encountered, a return address is popped from the top of RAS 130 and used as the location from which to fetch new instructions for the instruction stream. In various embodiments, rather than have one or more return addresses from main RAS 130 coupled back to NFP return table 118, NFP return table 118 stores a tag of a fetch address group and one or more status bits.

Global branch history tracking unit 122 may be configured to track the global branch history of instructions executed by the host processor. Global branch history tracking unit 122 may use any of various techniques for monitoring and storing history data associated with the branches being executed by the processor. For example, in one embodiment, global branch history tracking unit 122 may track the taken/not-taken status of each branch being fetched and executed by the processor. The taken/not-taken status may be encoded with a '1' for taken and a '0' for not taken.

In another embodiment, global branch history tracking unit 122 may track the taken/not-taken status of each branch and the target of each taken branch. Global branch history tracking unit 122 may encode the data into a combined bit stream and then provide this bit stream (or a portion thereof) to next fetch predictor 114 and branch predictor 126. Other techniques for tracking and storing branch history data by global branch history tracking unit 122 are possible and are contemplated.

Referring to FIG. 2, a generalized block diagram illustrating one embodiment of fetched groups of instructions 200 is shown. As shown, the fetch width for groups 230 and 232 is 16 as the integer N for the group of instructions 200 is 16. There are 16 instructions with respective offsets from 0 to 15 as shown in the instruction offset field 210. However, as described earlier, the number of instructions in the fetched group of instructions 200 may vary. Although fields 205-225 are shown, the information shown for the fetched groups 230 and 232 is used to describe the characteristics and the parameters of the fetched groups of instructions 230 and 232.

In the illustrated embodiment, the fetch address 205 includes "0x" indicating that the address is in a hexadecimal format, with the specific value 04A8. In some embodiments, the fetched group of instructions 200 is an entire cache line stored in the instruction cache. In other embodiments, the fetched group of instructions 200 is a portion of a cache line stored in the instruction cache. The offsets in the instruction offset field 210 may correspond to any of a number of instruction bytes. The instruction sizes may be 32 bytes, 64 bytes and so forth. Here, the offset corresponds to same sized instructions. Therefore, each increment of an offset in the instruction offset field 210 corresponds to a same number of bytes to a next contiguous instruction of the fetched group of instructions 200. However, in other embodiments, variable-sized instructions may be used and an instruction size may be indicated along with the offset in order to indicate an associated address. Further, although the address is illustrated in this embodiment as being represented by a hexadecimal value, other types of values may be used to represent the address in other embodiments.

Instruction types are indicated in field 215. As shown, the fetched groups of instructions 200 include non-branch instruction types, unconditional indirect branch instructions, conditional direct branch instructions and returns. As shown, the first instruction, which is a non-branch instruction, is located at the address 0x04A8, which is the sum of the address 0x04A8 and the offset 0. The second instruction, which is also a non-branch instruction, is located at an address that is the sum of the address 0x04A8 and the offset 1, which is the address 0x04A9.

As shown, the direct branch instructions corresponding to offsets 7 and 11 in the instruction offset field 210 have known target addresses. The target address for the direct branch instruction corresponding to offset 7 is the contents of the program counter (PC), which is 0x04A8+7 or 0x04AF, summed with an address offset encoded in the direct branch instruction. This target address is denoted as Target-A in the target address indication field 225. Similarly, the target address for the direct branch instruction corresponding to offset 11 is the contents of the PC, which is 0x04A8+11 or 0x04B3, summed with an address offset encoded in the direct branch instruction. This target address is denoted as Target-B in the target address indication field 225.

Although the direct branch instructions shown in the fetched group of instructions 200 are conditional, it is noted that an unconditional direct branch instructions would also have a target address that is the contents of the program counter summed with an address offset encoded in the direct branch instruction. The function return instruction corresponding to offset 14 in the instruction offset field 210 has a known target address, which is the contents of the return address stack (RAS). The target addresses is denoted as RAS pop in the target address indication field 225. The target addresses for direct branch instructions (conditional or unconditional) and function return instructions may be resolved within a given amount of time. In contrast, the target address for an indirect branch instruction (conditional or unconditional) may not be resolved with an access of the working register file.

The target addresses may be stored as next fetch addresses at a later time in one of a next fetch predictor and an allocate buffer. In one example, one of next fetch predictor and allocate buffer may store the target address Target-A to be used for later next fetch predictions. At a later time, when the instruction fetch unit sends the fetch address 0x04AC contents of the PC, which is 0x04A8+7 or 0x04AF, to the instruction cache, one of next fetch predictor and allocate buffer may provide the Target-A as a next fetch prediction to the instruction fetch unit.

In a similar manner, one of next fetch predictor and allocate buffer may store the address of the non-branch instruction corresponding to the instruction offset 8, which is the sum of 0x4A8 and the offset 8 or 0x04B0. In addition, one of next fetch predictor and allocate buffer may store the target address Target-B to be used for later next fetch predictions. At a later time, when the instruction fetch unit sends the fetch address 0x04B0 to the instruction cache, one of next fetch predictor and allocate buffer may provide the Target-B as a next fetch prediction to the instruction fetch unit. In addition, hits in the return table indicates the return address stack stores the target address. At a later time, when the instruction fetch unit sends the fetch address 0x04B6, which is 0x04A8+14 or 0x04B6, a hit in the return table provides the indication that the return address stack stores the target address as a next fetch prediction to the instruction fetch unit.

It is noted that while FIG. 2 shows a Target Address Indication (field 225) that shows a target address for conditional direct branches, in various embodiments the actual target also depends on the taken/not-taken status of those branches. In some embodiments, it may be assumed that all conditional branches are taken. However, in other embodiments, it may be assumed that all conditional branches as not-taken. For example, in such an embodiment the Target-A and Target-B entries in FIG. 2 would all become 'RAS pop' as the exit would be at the return. These and other embodiments are possible and are contemplated.

Figure 3:
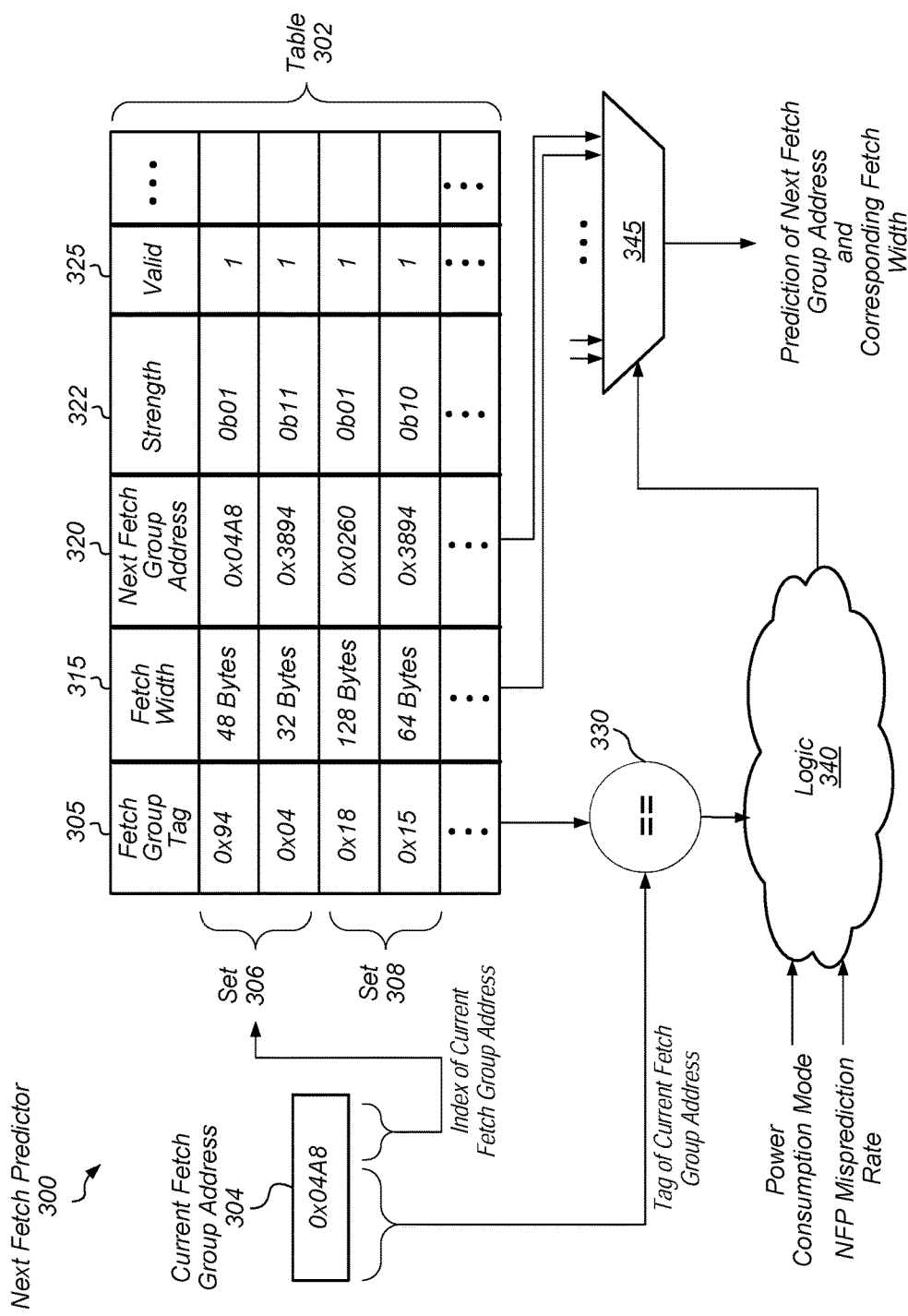
FIG. 3 is a block diagram of one embodiment of a next fetch predictor.

Turning now to FIG. 3, one embodiment of a table 302 for use in a next fetch predictor (NFP) 300 is shown. NFP 300 may include table 302, comparison logic 330, logic 340, and multiplexer (or mux) 345. Table 302 may also be referred to as an array. Table 302 may include a plurality of entries, each entry being populated with a number of fields. For example, in one embodiment, each entry of table 302 may include a fetch group address field 305, fetch width field 315, next fetch group address field 320, a strength field 322, valid field 325, and one or more other fields.

In some embodiments, table 302 is arranged in a set associative manner. For example, table 302 is an n-way set associative data structure where 'n' is a positive integer. In the illustrated embodiment, table 302 is a 2-way set associative data structure. A different number of ways, such as 4-way, 8-way, or other, within the set-associative table 302 may be chosen in addition to a direct-mapped implementation. A given set, such as set 306 and set 308, may be selected from other sets by an index portion of the current fetch group address 304. In some embodiments, an access hit may occur when one of the fetch group tags 305 (e.g., 0x94 and 0x04 in set 306) match a tag portion of the current fetch group address 304 and a corresponding valid field 325 indicates valid data in the entry.

As described earlier, during a hit, such as a hit for the entry with a fetch group tag 0x04 in set 306, the corresponding strength value of 0b11 may be considered relatively high. At a later time, if the branch predictor predicts a same next fetch address of 0x04A8, then the strength value may be incremented. If the counter already saturated, then the strength value remains at its current value. However, if the branch predictor predicts a different next fetch address, such as a fetch address of 0x0492, then the strength value may be decremented from 0b11 to 0b10.

During a miss, such as a miss in set 306 for a fetch group tag 0x57, it may be determined each of the entries has a relatively high strength value. For example, the strength values for set 306 are above zero with the values 0b01 and 0b11. Therefore, both entries may remain allocated in set 306 and the information for the fetch group tag 0x57 may be allocated in an external NFP fast table. In an embodiment, an entry number or other identifier for identifying the entry in the external NFP fast table allocated for the fetch group tag 0x57 may be stored in each of the entries in set 306. An additional field (not shown) may be updated with the identifier. As described earlier, in some embodiments, the strength value for an entry decreases when the branch predictor generates a different next fetch address than a value stored in the entry. When the strength value is below a threshold, and a stored identifier identifies an allocated entry in the external NFP fast table, in some embodiments, the information stored in the identified entry in the NFP fast table replaces the information currently stored in table 302.

The number of entries in table 302 may vary according to the embodiment. Nevertheless, by using the techniques described herein, the number of entries in table 302 may be minimized in addition to a number of entries simultaneously searched, allowing for a reduction in power consumption during each lookup of table 302 and a reduction in the area used for implementing table 302 in NFP 300. NFP 300 may perform a lookup of table 302 to column 305 using the current fetch group address (or a portion thereof). For example, the tag portion of the current fetch group address 304 may be used. In one embodiment, column 305 of table 302 may be implemented as content-addressable-memory (CAM) fields within sets to facilitate efficient searches of this column.

The results of comparison logic 330 may be coupled to logic 340, which may generate a select signal for mux 345 to select the appropriate prediction for the next fetch group address and a corresponding fetch width. Additionally, the selection determined by the logic 340 may depend on a priority scheme and any of various other factors (e.g., power consumption mode, NFP misprediction rate). In some embodiments, the priority scheme is programmable such as logic receiving settings from configurable registers.

Figure 4:
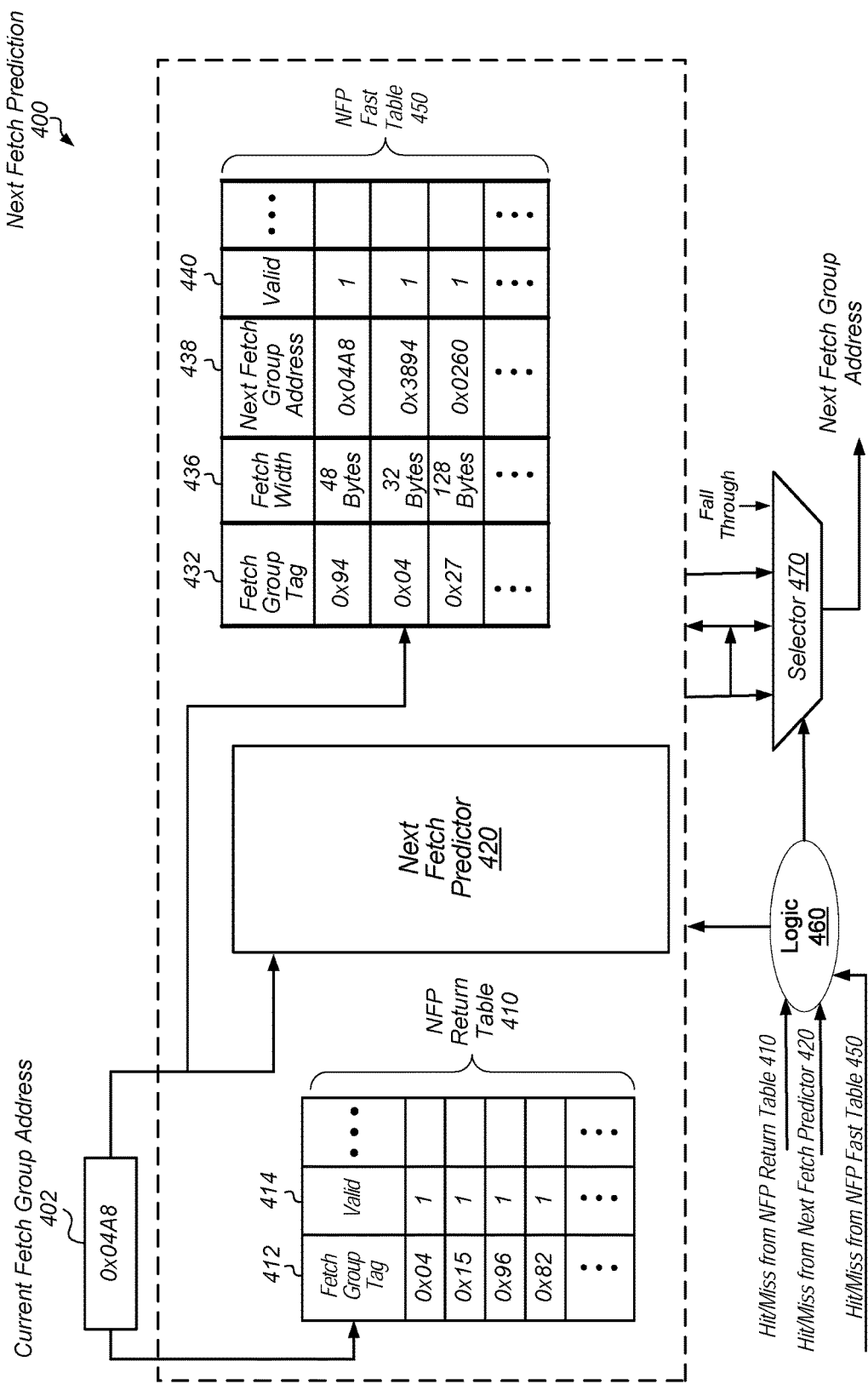
FIG. 4 is a block diagram of one embodiment of next fetch prediction with multiple predictors.

Turning now to FIG. 4, one embodiment of next fetch prediction 400 is shown. In the illustrated embodiment, multiple predictors are used such as NFP return table 410, next fetch predictor 420 and NFP fast table 450. Access logic, read and write lines, decoders and so forth are not shown for ease of illustration. In various embodiments, next fetch predictor 420 uses an implementation shown earlier for next fetch predictor 300 in FIG. 3.

NFP return table 410 may include a table with multiple entries populated with at least fields 412 and 414. In some embodiments, the field 412 is used to store a current fetch address (or a portion, thereof) at a time the table entry is allocated. The field 414 is used to store an indication specifying whether the entry is allocated with a valid current fetch address. In some embodiments, NFP return table 410 does not store any indication of a target address. Rather, a hit in NFP return table 410 provides a prediction that the target address is from the top of the return address stack (RAS) such as a speculative RAS in the next fetch prediction stage or from the RAS that is updated in the branch predictor stage. In some embodiments, NFP return table 410 is searched in parallel with next fetch predictor 420. In various embodiments, a fetch group address with a target address in the RAS has an entry allocated only in NFP return table 410.

Similar to NFP return table 410, in various embodiments, NFP fast table 450 also stores a subset of information stored in next fetch predictor 420. As shown, NFP fast table 450 includes a table with multiple entries populated with fields 432, 436, 438 and 440. In an embodiment, field 432 is used to store a current fetch address (or a portion, thereof) at a time the table entry is allocated. In some embodiments, field 432 stores both a tag portion and an index portion of the current fetch address. The index portion may be used at a later time to identify a set within next fetch predictor 420 for allocation. In one embodiment, each of the fields 436, 438 and 440 is used to store information similar to information described earlier for fields 315, 320 and 325 of FIG. 3. In an embodiment, next fetch predictor 420 stores predictive strength and hysteresis information either separately or combined in the strength value as described earlier, whereas NFP fast table 450 does not store this information. In some embodiments, NFP fast table 450 is a first-in-first-out (FIFO) buffer.

In some embodiments, when the lookup for next fetch predictor 420 results in a miss, next fetch predictor 420 searches for an empty entry for allocation. However, if no empty entry is found, then next fetch predictor 420 identifies one or more candidate entries for allocation. As described earlier, in some embodiments, next fetch predictor 420 includes an n-way set associative data structure where 'n' is a positive integer. In an embodiment, the candidate entries for allocation are the 'n' ways within the set selected during lookup.

In some embodiments, when a strength value for a given entry of the one or more candidate entries is below a threshold, the given entry is overwritten with the current fetch address. When none of the one or more candidate entries has a strength value below the threshold, each of the candidate entries is considered to be relatively strong for providing useful predictions. Therefore, no replacements are performed in the next fetch predictor 420, and an entry in NFP fast table 450 is allocated with the current fetch address. Accordingly, the associativity is increased for the selected set of next fetch predictor 420 due to the external entries in NFP fast table 450. In addition, in various embodiments, there is no check performed in NFP fast table 450 prior to allocating an entry. For example, there is no strength value stored let alone checked in NFP fast table 450 prior to allocating an entry. Therefore, allocation occurs relatively quicker for NFP fast table 450 than for next fetch predictor 420. At a later time, when the strength value for a given candidate entry of the one or more candidate entries in next fetch predictor 420 falls below the threshold, the corresponding entry in NFP fast table 450 replaces the given candidate entry in next fetch predictor 420. The corresponding entry is deallocated in NFP fast table 450 after the replacement.

The next fetch address is typically generated before any instruction data is received from the previous instruction fetch. In addition, the predicted next fetch address is needed within a single clock cycle for the next fetch operation. Therefore, predictions for next fetch addresses are typically generated from stored information corresponding to a history of fetch addresses. Next fetch prediction 400 may be used to provide a prediction for the next fetch address based on the current fetch address. Typically, the prediction is provided within a single clock cycle.

In various embodiments, when the current fetch group address 402 is received, each of NFP return table 410, next fetch predictor 420 and NFP fast table 450 performs a lookup into respective tables. The control logic 460 may receive hit and miss results from each of NFP return table 410, next fetch predictor 420 and NFP fast table 450 to select the appropriate prediction for the next fetch address. The control logic 460 may use one of a variety of priority schemes. For example, in an embodiment, next fetch predictor 420 has the highest priority with NFP return table 410 having the second highest priority and NFP fast table 450 having the lowest priority. However, other priority schemes are possible and contemplated. Similar to the earlier logic 340, the control logic 460 may use a programmable priority scheme and use one or more other factors when selecting the next fetch address.

The control logic 460 may generate a select signal for the selector 470, which may be implemented as a multiplexer, to select the appropriate prediction for the next fetch address. The instruction fetch unit may use the selected prediction as the next fetch address. In addition, a predicted fetch width may also be conveyed by selector 470 if provided. If the lookup in each of NFP return table 410, next fetch predictor 420 and NFP fast table 450 results in a miss, then the control logic 460 and the selector 470 may select a fall through address as the next fetch address. The fall through address may be the current fetch address summed with an instruction fetch width and one to point to a next group of instructions, such as a next contiguous instruction cache line.

Figure 5:
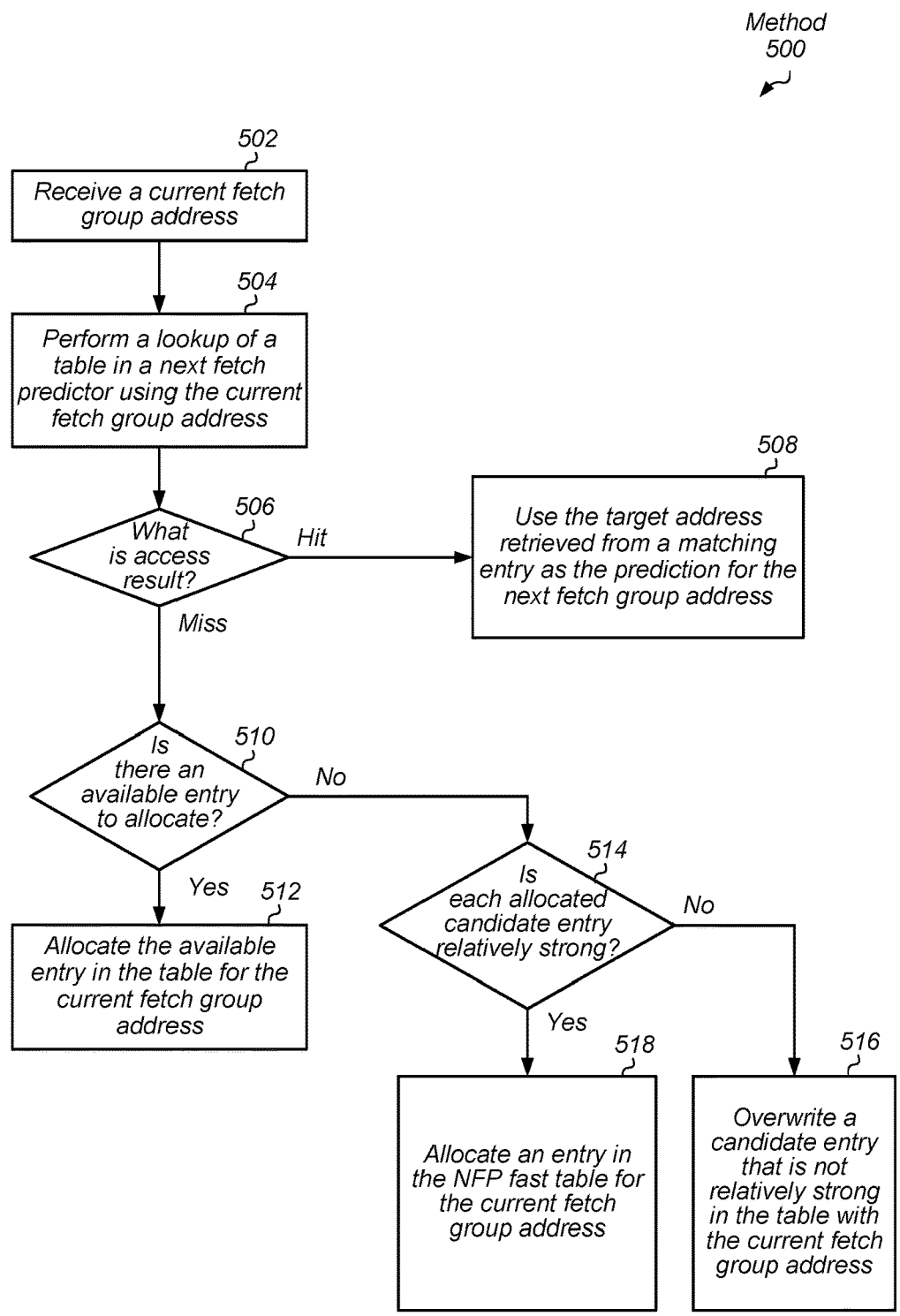
FIG. 5 is a generalized flow diagram illustrating one embodiment of a method for generating a prediction of a next fetch address.

Referring now to FIG. 5, one embodiment of a method 500 for generating a prediction of a next fetch address is shown. For purposes of discussion, the steps in this embodiment (likewise for FIG. 6) are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 500.

A current fetch group address is received (block 502). A lookup of a table in a next fetch predictor is performed using the current fetch group address (block 504). If the access result is a hit ("Hit" branch of the conditional block 506), then the target address retrieved from a matching entry is used as the prediction for the next fetch group address (block 508). If the access result is a miss ("Miss" branch of the conditional block 506), and if there is an entry available for allocation ("yes" branch of the conditional block 510), then the available entry in the array is allocated for the current fetch group address (block 512). In various embodiments, an entry is considered available when it stores no valid information.

If the access result is a miss ("Miss" branch of the conditional block 506), and if there is no available entry to allocate ("no" branch of the conditional block 510), then one or more candidate entries for being overwritten are identified. In addition, the strength value for the one or more candidate entries are inspected and compared to a threshold. If at least one allocated candidate entry is not relatively strong ("no" branch of the conditional block 514), then a candidate entry that is not relatively strong is overwritten with at least the current fetch group address (block 516). If each allocated candidate entry is relatively strong ("yes" branch of the conditional block 514), then an entry is allocated in the NFP fast table with the current fetch group address (block 518).

Figure 6:
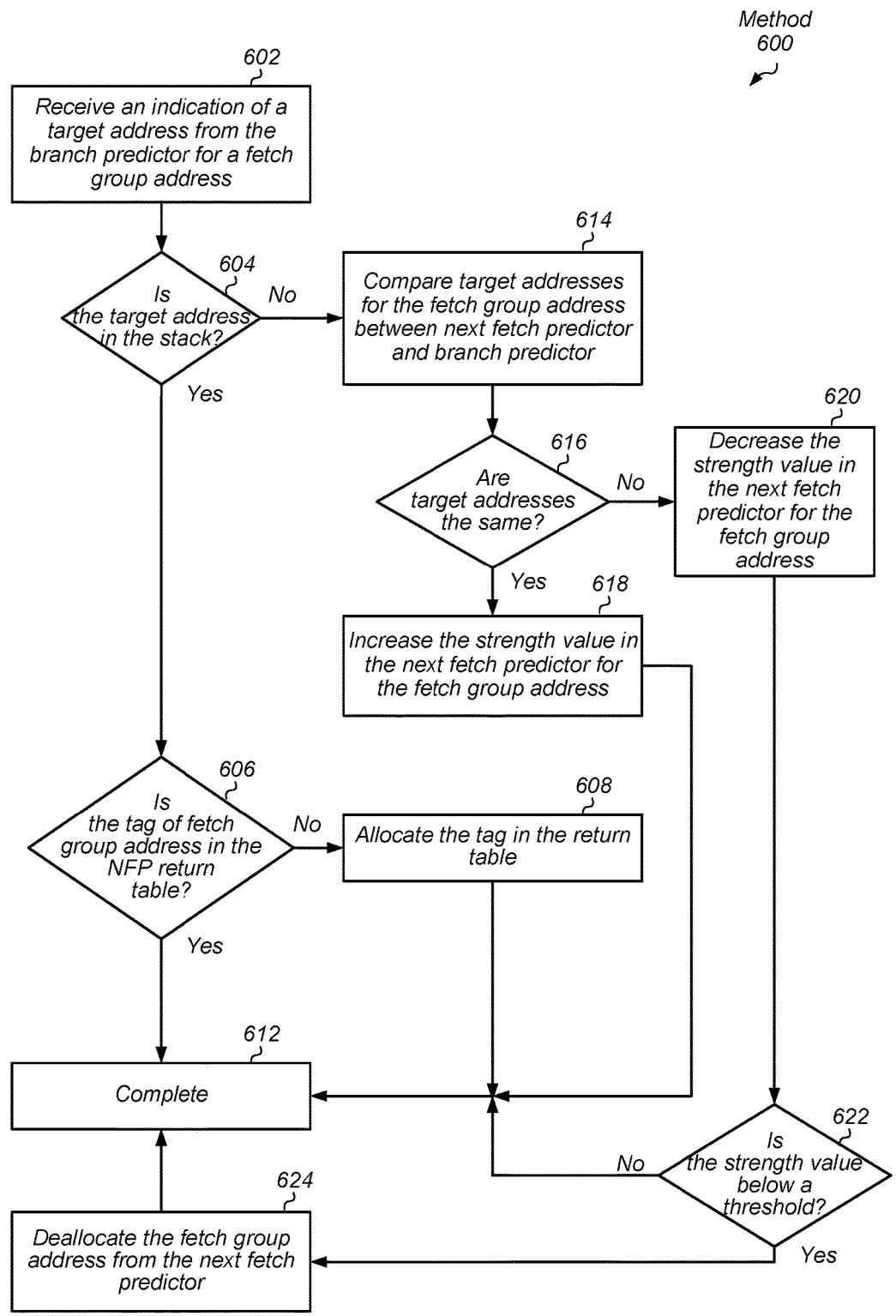
FIG. 6 is a generalized flow diagram illustrating one embodiment of a method for training multiple predictors for generating a prediction of a next fetch address.

Turning now to FIG. 6, one embodiment of a method 600 for training multiple predictors for generating a prediction of a next fetch address is shown. An indication of a target address is received from the branch predictor for a fetch group address (block 602). If the indication specifies the target address is in the return address stack (RAS) ("yes" branch of the conditional block 604), and if at least the tag of the fetch group address is in the return table ("yes" block of the conditional block 606), then the method completes (block 612). However, if at least the tag of the fetch group address is not in the return table ("no" block of the conditional block 606), then at least the tag is allocated in the return table (block 608) and the method 600 completes (block 612).

If the indication specifies the target address is not in the return address stack (RAS) ("no" branch of the conditional block 604), then target addresses for the fetch group address are compared between the next fetch predictor and the branch predictor for the fetch group address (block 614). If the fetch group address is not in the next fetch predictor, then in one embodiment, the method 600 completes. The fetch group address may be stored in the NFP fast table, but the NFP fast table does not store a strength value, which can be updated. Therefore, if the fetch group address is stored in the NFP fast table, the corresponding next fetch address (target address) maintains its value.

If the target addresses compared between the branch predictor and an entry in the next fetch predictor are the same ("yes" branch of the conditional block 616), then the strength value in the next fetch predictor for the fetch group address is increased (block 618). The increase is based on the format of the strength value stored in a corresponding table entry in the next fetch predictor. For example, any one of the previously described formats, such as a count, may be used. Afterward, the method 600 completes (block 612).

If the target addresses are not the same ("no" branch of the conditional block 616), then the strength value in the next fetch predictor for the fetch group address is decreased (block 620). The decrease is based on the format of the strength value stored in a corresponding table entry in the next fetch predictor. For example, any one of the previously described formats, such as a count, may be used. If the strength value does not fall below a threshold ("no" branch of the conditional block 622), then the method 600 completes (block 612). If the strength value falls below a threshold ("yes" branch of the conditional block 622), then in some embodiments, the fetch group address is deallocated from the next fetch predictor (block 624). In other embodiments, the entry remains, but may be removed at a later time during a miss. In yet other embodiments, if a fetch group address stored in the NFP fast table maps to the set storing the entry with the relatively weak strength value, then the entry is replaced with the information stored in the NFP fast table.

Figure 7:
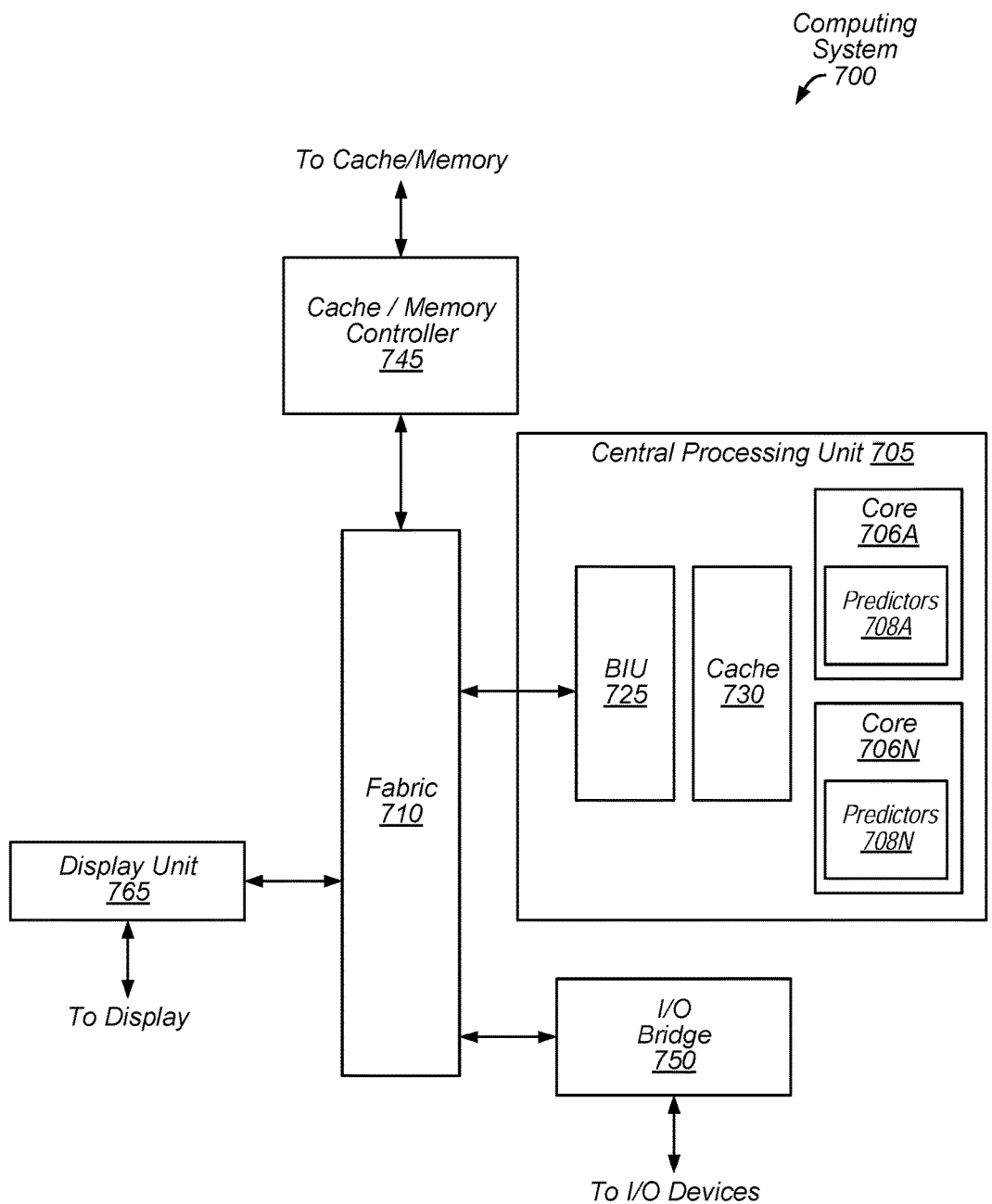
FIG. 7 is a generalized flow diagram illustrating one embodiment of a computing system.

Referring now to FIG. 7, a block diagram illustrating one embodiment of a computing system 700 is shown. In some embodiments, some or all elements of the computing system 700 may be included within a system on a chip (SoC). In some embodiments, computing system 700 may be included in a mobile device. In the illustrated embodiment, the computing system 700 includes fabric 710, central processing unit (CPU) 705, input/output (I/O) bridge 750, cache/memory controller 745, and display unit 765. Although the computing system 700 illustrates central processing unit 705 as being connected to fabric 710 as a sole central processing unit of the computing system 700, in other embodiments, central processing unit 705 may be connected to or included in other components of the computing system 700. Additionally or alternatively, the computing system 700 may include multiple central processing units 705. The multiple central processing units 705 may include different units or equivalent units, depending on the embodiment.

Fabric 710 may include various interconnects, buses, MUXes, controllers, etc., and may be configured to facilitate communication between various elements of computing system 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, central processing unit 705 includes bus interface unit (BIU) 725, cache 730, and cores 706A and 706N. In various embodiments, central processing unit 705 may include various numbers of cores and/or caches. For example, central processing unit 705 may include 1, 2, or 4 processor cores, or any other suitable number. In some embodiments, cores 706A and/or 706N include internal instruction and/or data caches. In various embodiments, cores 706A and 706N include predictors 708A and 708N, each includes multiple predictors such as the NFP return table, next fetch predictor and NFP fast table as described earlier. Predictors 708A and 708N may be used to provide predictions of next fetch addresses.

In some embodiments, a coherency unit (not shown) in fabric 710, cache 730, or elsewhere in computing system 700 may be configured to maintain coherency between various caches of computing system 700. BIU 725 may be configured to manage communication between central processing unit 705 and other elements of computing system 700. Processor cores such as cores 706A and 706N may be configured to execute instructions of a particular instruction set architecture (ISA), which may include operating system instructions and user application instructions. For example, cores 706A and 706N may include at least a front-end pipeline as described earlier for pipeline 100 of FIG. 1. Cores 706A and 706N may also use a variety of integer and floating-point execution units, a load-store unit for processing memory accesses, a reorder buffer for coordinating the transfer of speculative results into the architectural state of a corresponding processor core.

Cache/memory controller 745 may be configured to manage transfer of data between fabric 710 and one or more caches and/or memories (e.g., non-transitory computer readable mediums). For example, cache/memory controller 745 may be coupled to an L3 cache, which may, in turn, be coupled to a system memory. In other embodiments, cache/memory controller 745 may be directly coupled to a memory. In some embodiments, the cache/memory controller 745 may include one or more internal caches.

Display unit 765 may be configured to read data from a frame buffer and provide a stream of pixel values for display. Display unit 765 may be configured as a display pipeline in some embodiments. Furthermore, display unit 765 may include one or more interfaces (e.g., MIPI® or embedded display port (eDP)) for coupling to a user display (e.g., a touchscreen or an external display). I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 700 via I/O bridge 750. In some embodiments, central processing unit 705 may be coupled to computing system 700 via I/O bridge 750.

It is noted that other embodiments may include other combinations of components, including subsets or supersets of the components shown in FIG. 7 and/or other components. While one instance of a given component may be shown in FIG. 7, other embodiments may include two or more instances of the given component. Similarly, throughout this detailed description, two or more instances of a given component may be included even if only one is shown, and/or embodiments that include only one instance may be used even if multiple instances are shown.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a cache comprising a first table, wherein the first table comprises a plurality of entries;
   an array comprising a second table, wherein the second table comprises a plurality of entries; and
   control logic, wherein in response to determining a received fetch address misses in the first table and the first table has no entries available for allocation, the control logic is configured to:
   overwrite a given entry of the first table with the received fetch address, in response to detecting a strength value for the given entry is below a threshold; and
   allocate an entry in the second table for the received fetch address, in response to detecting no entries of the first table have a strength value below the threshold.

2. The apparatus as recited in claim 1, wherein the control logic is configured to allocate the entry in the second table for the received fetch address in further response to determining the received fetch address is not currently stored in the second table.

3. The apparatus as recited in claim 1, wherein the control logic is further configured to overwrite a first entry of the first table with at least a fetch address stored in a second entry of the second table, in response to determining:
   a strength value for the first entry is below the threshold; and
   an identifier stored in the first entry identifies the second entry.

4. The apparatus as recited in claim 3, wherein the first entry is configured to store an indication of hysteresis based at least in part on a branch history.

5. The apparatus as recited in claim 3, wherein in response to receiving a next fetch address corresponding to a given fetch address, the control logic is further configured to:
   determine the given fetch address hits in the first table, wherein a matching entry stores at least a portion of the given fetch address; and
   reduce a strength value of the matching entry, in response to determining the next fetch address does not match a given target address stored in the matching entry.

6. The apparatus as recited in claim 5, wherein the control logic is further configured to increase the strength value of the matching entry, in response to determining the next fetch address matches the given target address.

7. The apparatus as recited in claim 1, further comprising a third table comprising a plurality of entries, wherein in response to an indication that a target address for a given fetch address is a return address for a function call, the control logic is further configured to allocate an entry in the third table for the given fetch address.

8. The apparatus as recited in claim 7, wherein
   the entry in the third table is configured to store a tag portion of the given fetch address; and
   the entry of the third table does not store an indication of a target address.

9. The apparatus as recited in claim 3, wherein storage of data in the first table follows a set associative arrangement.

10. The apparatus as recited in claim 3, wherein storage of data in the second table follows a first-in-first-out arrangement.

11. A method comprising:
    storing indications of target addresses in a plurality of entries of a first table;

storing indications of target addresses in a plurality of entries of a second table;

wherein in response to determining a received fetch address misses in the first table and the first table has no entries available for allocation:
  overwriting a given entry of the first table with the received fetch address, in response to detecting a strength value for the given entry is below a threshold; and
  allocating an entry in the second table for the received fetch address, in response to detecting no entries of the first table have a strength value below the threshold.

12. The method as recited in claim 11, further comprising allocating the entry in the second table for the received fetch in further response to determining the received fetch address is not currently stored in the second table.

13. The method as recited in claim 11, further comprising overwriting a first entry of the first table with at least a fetch address stored in a second entry of the second table, in response to determining:
  a strength value for the first entry is below the threshold; and
  an identifier stored in the first entry identifies the second entry.

14. The method as recited in claim 13, wherein in response to receiving a next fetch address corresponding to a given fetch address, the method further comprises:
  determining the given fetch address hits in the first table, wherein a matching entry stores at least a portion of the given fetch address; and
  reducing a strength value of the matching entry, in response to determining the next fetch address does not match a given target address stored in the matching entry.

15. The method as recited in claim 11, wherein in response to an indication that a target address for a given fetch address is a return address for a function call, the method further comprises allocating an entry in a third table for the given fetch address.

16. A processor comprising:
  a first predictor comprising a first table;
  a second predictor comprising a second table;
  wherein in response to determining a received fetch address misses in the first table and the first table has no entries available for allocation, the first predictor is configured to:
    overwrite a given entry of the first table with the received fetch address, in response to detecting a strength value for the given entry is below a threshold; and
    allocate an entry in the second table for the received fetch address, in response to detecting no entries of the first table have a strength value below the threshold.

17. The processor as recited in claim 16, wherein the second predictor is configured to allocate the entry in the second table for the received fetch address in further response to determining the received fetch address is not currently stored in the second table.

18. The processor as recited in claim 16, wherein the first predictor is further configured to overwrite a first entry of the first table with at least a fetch address stored in a second entry of the second table, in response to determining
  a strength value for the first entry is below the threshold; and
  an identifier stored in the first entry identifies the second entry.

19. The processor as recited in claim 18, further comprising a branch predictor, wherein in response to receiving a next fetch address that corresponds to a given fetch address from the branch predictor, the first predictor is configured to:
  determine the given fetch address hits in the first table, wherein a matching entry stores at least a portion of the given fetch address; and
  reduce a strength value of the matching entry, in response to determining the next fetch address does not match a given target address stored in the matching entry.

20. The processor as recited in claim 16, further comprising a third predictor comprising a third table, wherein in response to an indication that a target address for a given fetch address is a return address for a function call, the third predictor is configured to allocate an entry in the third table for the given fetch address.

* * * * *